US011891546B2

(12) United States Patent
Mennecke et al.

(10) Patent No.: US 11,891,546 B2
(45) Date of Patent: Feb. 6, 2024

(54) CATALYST-FREE CURABLE COMPOSITIONS BASED ON SILANE-FUNCTIONAL POLYMERS

(71) Applicant: SIKA TECHNOLOGY AG, Baar (CH)

(72) Inventors: Klaas Mennecke, Lottstetten (DE); Marcel Oertli, Winthertur (CH)

(73) Assignee: SIKA TECHNOLOGY AG, Baar (CH)

( * ) Notice: Subject to any disclaimer, the term of this patent is extended or adjusted under 35 U.S.C. 154(b) by 626 days.

(21) Appl. No.: 17/253,215

(22) PCT Filed: Jun. 24, 2019

(86) PCT No.: PCT/EP2019/066703
§ 371 (c)(1),
(2) Date: Dec. 17, 2020

(87) PCT Pub. No.: WO2020/002257
PCT Pub. Date: Jan. 2, 2020

(65) Prior Publication Data
US 2021/0115311 A1 Apr. 22, 2021

(30) Foreign Application Priority Data
Jun. 25, 2018 (EP) .................................. 18179559

(51) Int. Cl.
| | |
|---|---|
| *C08L 83/04* | (2006.01) |
| *C08K 5/549* | (2006.01) |
| *C09J 183/04* | (2006.01) |
| *C09D 183/04* | (2006.01) |
| *C07F 7/08* | (2006.01) |
| *C07F 7/18* | (2006.01) |
| *C08G 65/336* | (2006.01) |
| *C08G 77/16* | (2006.01) |
| *C08G 77/18* | (2006.01) |

(52) U.S. Cl.
CPC .......... *C09J 183/04* (2013.01); *C08G 65/336* (2013.01); *C08G 77/16* (2013.01); *C08G 77/18* (2013.01); *C08K 5/549* (2013.01); *C08L 83/04* (2013.01); *C09D 183/04* (2013.01); *C07F 7/0816* (2013.01); *C07F 7/0834* (2013.01); *C07F 7/18* (2013.01); *C07F 7/1804* (2013.01)

(58) Field of Classification Search
None
See application file for complete search history.

(56) References Cited

U.S. PATENT DOCUMENTS

| | | | |
|---|---|---|---|
| 5,364,955 A | 11/1994 | Zwiener et al. | |
| 2008/0237537 A1* | 10/2008 | Huang | C07F 7/1804 556/407 |
| 2012/0251832 A1 | 10/2012 | Huang et al. | |
| 2015/0166708 A1* | 6/2015 | Alam | C08F 255/02 525/106 |
| 2016/0053442 A1 | 2/2016 | Kaiser | |
| 2016/0257819 A1 | 9/2016 | Pathak et al. | |
| 2018/0355283 A1* | 12/2018 | Goubard | C11D 11/0041 |

FOREIGN PATENT DOCUMENTS

| | | |
|---|---|---|
| CN | 102482456 A | 5/2012 |
| KR | 10-2019-0021403 A | 3/2019 |
| WO | 2008/121360 A1 | 10/2008 |

OTHER PUBLICATIONS

Jul. 12, 2019 Search Report issued in International Patent Application No. PCT/EP2019/066703.
Jul. 12, 2019 Written Opinion of the International Searching Authority issued in International Patent Application No. PCT/EP2019/066703.

* cited by examiner

*Primary Examiner* — Richard A Huhn
(74) *Attorney, Agent, or Firm* — Oliff PLC

(57) ABSTRACT

A moisture-curable composition, including at least one polymer P containing reactive silane groups; between 0.1 and 5 wt.-%, based on the total composition, of at least one organosilane OS of the formula (I), wherein $R^{20}$ independently stands for a monovalent, optionally cyclic or branched, hydrocarbyl or heterocarbyl radical, optionally comprising aromatic moieties, which contains 1 to 12 carbon atoms and wherein the carbon atom next to the silicon atom either bonds via a C═C double bond to another carbon atom or bonds to a heteroatom selected from O, N, and S; $R^{21}$ independently stands for a linear, cyclic, or branched divalent hydrocarbyl radical having 2 to 12 carbon atoms and optionally containing aromatic moieties; $R^{22}$ stands for a hydrogen atom or a group of the formula (Ia); characterized in that the curable composition does not contain catalytically active organometallic or acidic compounds.

15 Claims, No Drawings

CATALYST-FREE CURABLE COMPOSITIONS BASED ON SILANE-FUNCTIONAL POLYMERS

TECHNICAL FIELD

The invention relates to curable compositions based on silane-functional polymers and their use as adhesives, sealants, or coatings.

STATE OF THE ART

Curable compositions based on polymers containing reactive silane groups play an important role in many industrial applications, for example as adhesives, sealants or coatings. Polymers containing reactive silane groups are in particular polydiorganosiloxanes, which are commonly referred to as "silicones" or "silicone rubbers", and organic polymers containing reactive silane groups, which are also referred to as "silane-functional polymers", "silane-modified polymers" (SMP) or "silane-terminated polymers" (STP). Compositions containing these polymers are cured via crosslinking reactions of the reactive silane groups on the polymers, which hydrolyze under the influence of moisture, condense with one another as silanol groups and thus form siloxane bonds. Most commonly, these reactive silane groups are alkoxysilane groups. These alkoxysilane groups should not have a too high reactivity towards water in order to ensure a sufficiently high storage stability of the compositions and a user-friendly application window. On the other hand, the reactivity should be high enough such that the curable compositions cure within useful time. Most commonly, such compositions therefore contain curing catalysts. These catalysts catalyze the hydrolysis and/or the condensation of the reactive silane groups of the polymers and their chemical structure and amount in the compositions allow for a broad control of the curing rate of the compositions.

Most efficient and widely used such catalyst include metalorganic compounds, in particular tin and titanium complexes, acids, or strong bases. However, this also leads to certain problems. Since these catalysts are normally contained in the compositions in significant amounts, up to several weight percent of the total composition, they may lead to notable undesired effects. Many of the catalysts are under scrutiny due to potential toxicity issues, most notably organotin compounds, still being the most widely used catalysts for curing of polymers containing reactive silane groups. Others metal complexes, such as titanium complexes, may cause unwanted coloration of the compositions due to ligand exchanges or redox reactions. Acids and bases may interact with the substrates in undesired ways, e.g. by causing corrosion, and strong nitrogen bases may lead to salt formation with atmospheric carbon dioxide. Furthermore, migration of these catalysts to the surface of the cured composition or even into the substrate may lead to undesired effects there. There have been efforts to reduce the amount of problematic catalysts or to replace them with less problematic compounds, such as non-migrating organic catalysts. One approach is to use highly reactive polymers, for example so-called "alpha" STP polymers that have increased reactivity on the reactive silane groups due to an electron-donating group in α-position to the reactive silicon atom. However, these polymers often require considerable amounts of drying agents in the composition in order to ensure a sufficiently high storage stability, since a very low level of water (for example stemming from fillers) is unavoidable. These drying agents or moisture scavengers, most commonly highly reactive organosilanes such as vinyl trimethoxysilane, have an impact on the volatile organic carbon (VOC) due to, e.g., methanol release, and they have an impact on the mechanical properties of the cured compositions. Non-migrating (e.g., chemically bonded) organic catalysts have the drawback of limited availability and high costs, and their limited mobility may negatively influence a homogeneous, fast curing of the compositions.

SUMMARY OF THE INVENTION

It is therefore an object of the present invention to provide a curable composition based on polymers containing reactive silane groups that can be formulated using standard sile-functional polymers without including common curing catalysts, in particular organometallic and acidic catalysts, but still shows a useful curing behavior and high storage stability. Another object of the invention is to provide cured such compositions with excellent mechanical properties.

The present invention achieves these objects with the features of independent claim 1.

The inclusion of between 0.1 and 5 wt.-%, based on the total composition, of at least one Organosilane OS according to the formula (I) below in a moisture-curable composition based on polymers containing reactive silane groups, but not containing catalytically active organometallic or acidic compounds, surprisingly enables a very suitable curing rate of the polymers and, even more surprisingly, improves the mechanical properties such as tensile strength, elongation at break, and Shore A hardness in the cured composition. Furthermore, it enables formulation of low VOC compositions that are completely free of methanol-releasing substances.

Further aspects of the invention are the subject of further independent claims. Particularly preferred embodiments of the invention are the subject of the dependent claims.

WAYS OF EXECUTING THE INVENTION

The present invention relates in a first aspect to a moisture-curable composition, comprising
at least one polymer P containing reactive silane groups;
between 0.1 and 5 wt.-%, based on the total composition, of at least one organosilane OS of the formula (I)

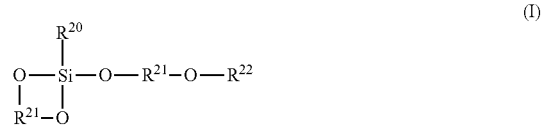

wherein
$R^{20}$ independently stands for a monovalent, optionally cyclic or branched, hydrocarbyl or heterocarbyl radical, optionally comprising aromatic moieties, which contains 1 to 12 carbon atoms and wherein the carbon atom next to the silicon atom either bonds via a C=C double bond to another carbon atom or bonds to a heteroatom selected from O, N, and S;
$R^{21}$ independently stands for a linear, cyclic, or branched divalent hydrocarbyl radical having 2 to 12 carbon atoms and optionally containing aromatic moieties; and
$R^{22}$ stands for a hydrogen atom or a group of the formula (a);

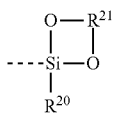

(Ia)

characterized in that
the curable composition does not contain catalytically active organometallic or acidic compounds.

In the present document, the term "reactive silane group" refers to a silyl group that is bonded to an organic radical or to a polyorganosiloxane radical and has one to three, especially two or three, hydrolyzable substituents or hydroxyl groups on the silicon atom. Particularly useful hydrolyzable substituents are alkoxy groups. These silane groups are also referred to as "alkoxysilane groups". Reactive silane groups may also be in partly or fully hydrolyzed form, for example as silanols.

"Hydroxysilane", "isocyanatosilane", "aminosilane" and "mercaptosilane" refer respectively to organoalkoxysilanes having one or more hydroxyl, isocyanato, amino or mercapto groups on the organic radical in addition to the silane group.

"Aminofunctional compound" refers to a compound that contains an amino group.

"Primary amino group" refers to an $NH_2$ group that is bonded to an organic radical, and "secondary amino group" refers to an NH group that is bonded to two organic radicals which may also together be part of a ring, and "tertiary amino group" refers to an N group that is bonded to three organic radicals, two or three of which together may also be part of one or more rings. Accordingly, "primary aminosilanes" are aminosilanes comprising a primary amino group and "secondary aminosilanes" are aminosilanes comprising a secondary amino group. The latter also encompasses compounds having both a primary and a secondary amino group.

"Polyoxyalkylene radical" refers to a linear or branched hydrocarbyl radical which contains ether groups and contains more than two repeat units of the (O—R) type in succession, where R is a linear or branched alkylene radical, as for example from the polyaddition of ethylene oxide or 1,2-propylene oxide onto starter molecules having two active hydrogen atoms.

Substance names beginning with "poly", such as polyol or polyisocyanate, refer to substances containing, in a formal sense, two or more of the functional groups that occur in their name per molecule.

The term "organic polymer" encompasses a collective of macromolecules that are chemically homogeneous but differ in relation to degree of polymerization, molar mass and chain length, which has been prepared by a poly reaction (polymerization, polyaddition, polycondensation) and has a majority of carbon atoms in the polymer backbone, and reaction products of such a collective of macromolecules. Polymers having a polyorganosiloxane backbone (commonly referred to as "silicones") are not organic polymers in the context of the present document.

The term "polyether containing reactive silane groups" also encompasses organic polymers which contain silane groups and which, in addition to polyether units, may also contain urethane groups, urea groups or thiourethane groups. Such polyethers containing reactive silane groups may also be referred to as "polyurethanes containing reactive silane groups".

"Molecular weight" is understood in the present document to mean the molar mass (in grams per mole) of a molecule or part of a molecule, also referred to as "radical". The term "radical" is used in this document in a formal sense, meaning a molecular rest bound to an atom by a covalent bond, while the bond is formally "cut" to describe the molecular rest attached to it. "Average molecular weight" is understood to mean the number-average $M_n$ of an oligomeric or polymeric mixture of molecules or radicals, which is typically determined by means of gel permeation chromatography (GPC) against polystyrene as standard.

"Weight percent" or "percentage by weight", and its abbreviation "wt.-%" refer to the weight percentage of a certain compound in a total composition, if not otherwise defined. The terms "weight" and "mass" are used interchangeably in this document and refer to the mass as a property of a physical body and commonly measured in kilograms (kg).

"Storage-stable" or "storable" refers to a substance or composition when it can be stored at room temperature in a suitable container over a prolonged period, typically at least 3 months up to 6 months or more, without any change in its application or use properties, especially in the viscosity and crosslinking rate, to a degree of relevance for the use thereof as a result of the storage.

"Room temperature" refers to a temperature of about 23° C.

All industrial standards and norms cited in this document refer to the respective edition in force on the time of filing of the first application of this invention, if not otherwise defined.

A dotted line in the formulae in this document in each case represents the bond between a substituent and the corresponding molecular radical.

The term "does not contain catalytically active organometallic or acidic compounds" means that no such compounds have been added during formulation of the composition. If traces of such species are unknowingly and/or unavoidably present, for example stemming from the synthesis of the silane-functional polymer, these are not considered as actual catalytically active organometallic or acidic compounds in the meaning used in this patent. The same applies for the term "does not contain catalytically active imidazoles, pyridines, phosphazene bases, secondary or tertiary amines, hexahydrotriazines, biguanides, guanidines, or amidines". Irrespective of this definition, if the content of a certain chemical species, such as catalytically active organometallic or acidic compounds, is present in the composition with an amount of less than 0.01 wt.-%, preferably less than 0.005 wt.-%, based on the total composition, the composition is also regarded as not containing this respective chemical species in the context of the present invention.

The composition comprises between 0.1 and 5 wt.-%, preferably between 0.5 and 3 wt.-%, more preferably between 1 and 2 wt.-%, based on the total composition, of at least one organosilane OS of the formula (I)

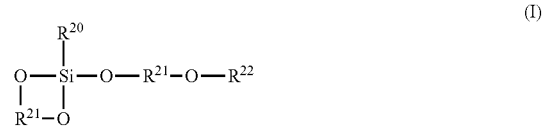

wherein $R^{20}$ independently stands for a monovalent, optionally cyclic or branched, hydrocarbyl or heterocarbyl radical, optionally comprising aromatic moieties, which contains 1 to 12 carbon atoms and wherein the carbon atom next to the silicon atom either bonds via a C=C double bond to another carbon atom or bonds to a heteroatom selected from O, N, and S;

$R^{21}$ independently stands for a linear, cyclic, or branched divalent hydrocarbyl radical having 2 to 12 carbon atoms and optionally containing cyclic and/or aromatic moieties; and $R^{22}$ stands for a hydrogen atom or a group of the formula (Ia).

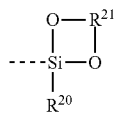
(Ia)

In preferred embodiments, each $R^{20}$ independently stands for a functional group selected from the group consisting of vinyl, phenyl, —$CH_2$—NH-cyclohexyl, —$CH_2$-methacrylate, and —$CH_2$—NH—(C=O)—O—$CH_3$.

Most preferably, $R^{20}$ is vinyl.

In the same or different preferred embodiments, each $R^{21}$ stands for a linear or branched divalent hydrocarbyl radical having 2 to 10 carbon atoms. Even more preferred, each $R^{21}$ independently is selected from the group consisting of ethanediyl, the isomers of propanediyl, the isomers of butanediyl, the isomers of pentanediyl, the isomers of hexanediyl, cyclohexanediyl, the isomers of heptanediyl, the isomers of octanediyl, and the isomers of nonanediyl.

Particularly preferred are the isomers of pentanediyl, in particular 2,2-dimethylpropanediyl.

$R^{22}$ preferably stands for a group of the formula (Ia).

Suitable organosilanes OS and their production are described in WO 2008/121360 A1. Suitable commercially available organosilanes OS are, for example, CoatOSil* T-Cure (Momentive) and Silquest* Y-15866 (Momentive).

The inventive composition may comprise between 0 and 2.5 wt.-%, based on the total composition, of at least one monomeric or oligomeric aminofunctional alkoxysilane. Preferably, the inventive composition comprises between 0.5 and 2 wt.-%, based on the total composition, of the monomeric or oligomeric aminofunctional alkoxysilane.

One advantage of using oligomeric alkoxysilanes is that lower VOC levels can be achieved when employing them in greater amounts compared to purely monomeric silanes.

Examples of monomeric aminofunctional alkoxysilanes that are suitable are shown in formula (II),

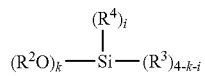
(II)

where $R^2$ is a monovalent alkyl radical having 1 to 6 carbon atoms, preferably 1 or 2 carbon atoms, most preferably a methyl radical;

$R^3$ is a monovalent aminoalkyl radical selected from —$C_pH_{2p}$—$NH_2$, —$C_pH_{2p}$—NH—$R^5$, —$C_pH_{2p}$—NH—$C_dH_{2d}$—$NH_2$, —$C_pH_{2p}$—NH—$C_dH_{2d}$—NH—$C_eH_{2e}$—$NH_2$, —$C_pH_{2p}$—NH—$C_dH_{2d}$—NH—$R^5$, and —$C_pH_{2p}$—NH—$C_dH_{2d}$—NH—$C_eH_{2e}$—NH—$R^5$;

$R^4$ is a monovalent linear, branched, or cyclic alkyl or arakyl radical having 1 to 12 carbon atoms, preferably 1 to 8 carbon atoms, most preferably a methyl radical;

$R^5$ is a monovalent linear, branched, or cyclic alkyl or arakyl radical having 1 to 12 carbon atoms, preferably 1 to 6 carbon atoms;

index i is an integer with a value of 0 or 1, preferably 0;
index k is an integer with a value of 2 or 3, with the provisio that if i=1 then k=2;
index p is an integer with a value of 1 to 6;
indices d and e are independently integers with a value of 2 to 6.

Suitable oligomeric silanes are shown in formula (III) and (IV), where formula (III) shows linear oligomers and formula (IV) shows cyclic oligomers. It is possible to also use branched oligomers, at least in portions of a mixture of oligomers.

Suitable linear oligomers for use as oligomeric silanes are shown in formula (III),

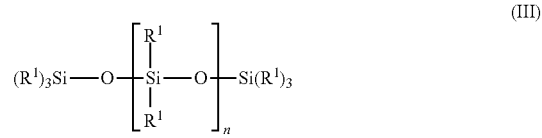
(III)

where
$R^1$ independently stands for
    an alkoxy radical with 1 to 6 carbon atoms, preferably 1 or two carbon atoms, more preferably a methoxy radical
    an $R^3$ as defined above, or
    an $R^4$ as defined above; and
index n is an integer with a value of 1 to 30.

Suitable cyclic oligomers for use as oligomeric silanes are shown in formula (IV),

(IV)

where
$R^1$ has the same meaning as above; and
Index j is an integer with a value of 3 to 30.

Preferred monomeric or oligomeric aminofunctional alkoxysilanes include N-(n-Butyl)-3-aminopropyltrimethoxysilane, 3-aminopropyltrimethoxysilane, 3-aminopropyldimethoxymethyl-silane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)-propyl]ethylenediamine and oligomers obtained from the condensation of the mentioned aminosilanes, optionally oligomerized together with alkylalkoxysilanes, in particular methyltrimethoxysilane, ethyltrimethoxysilane, propyltrimethoxysilane, vinyltrimethoxysilane, n-butyltrimethoxysilane, isobutyltrimethoxysilane, phenyltrimethoxysilane, and octyltrimethoxysilane. Also preferred are monomeric or oligomeric or the analogs thereof with ethoxy in place of methoxy groups.

These silanes, when used in the compositions according to the present invention, have the advantage that they both improve adhesion of the composition on various substrates and improve the curing rate of the composition, without being detrimental to the mechanical properties.

Furthermore required in the composition according to the present invention is at least one polymer P containing reactive silane groups.

The polymer P containing reactive silane groups is in particular selected from the group consisting of polyorganosiloxanes having terminal reactive silane groups and organic polymers containing reactive silane groups, as described more specifically hereinafter.

A polyorganosiloxane having terminal reactive silane groups has the advantage that, in the cured state, it is particularly water- and light-stable and enables particularly flexible properties.

An organic polymer containing reactive silane groups has the advantage of having particularly good adhesion properties on a multitude of substrates and being particularly inexpensive.

In general, it is preferred that the amount of polymer P in the composition is between 10 and 40 wt.-%, preferably between 15 and 30 wt.-%, based on the total composition. This range allows for good mechanical properties without making the composition too expensive.

In a preferred embodiment, the polymer P containing reactive silane groups is a polyorganosiloxane having terminal reactive silane groups.

A preferred polyorganosiloxane having terminal reactive silane groups has the formula (V)

$$(G)_{3-a}-\underset{(R)_a}{Si}-O-\left[\underset{R''}{\overset{R'}{Si}}-O\right]_m-\underset{(R)_a}{Si}-(G)_{3-a} \quad (V)$$

where
R, R' and R" are each independently a monovalent hydrocarbyl radical having 1 to 12 carbon atoms;
G is a hydroxyl radical or an alkoxy, acetoxy, ketoximato, amido or enoxy radical having 1 to 13 carbon atoms;
a is 0, 1 or 2; and
m is an integer in the range from 50 to about 2'500.

R is preferably methyl, vinyl or phenyl.

R' and R" are preferably each independently an alkyl radical having 1 to 5, preferably 1 to 3, carbon atoms, especially methyl.

G is preferably a hydroxyl radical or an alkoxy or ketoximato radical having 1 to 6 carbon atoms, especially a hydroxyl, methoxy, ethoxy, methylethylketoximato or methylisobutylketoximato radical.

More preferably, G is a hydroxyl radical.

a is preferably 0 or 1, especially 0.

In addition, m is preferably chosen such that the polyorganosiloxane of the formula (V) has a viscosity at room temperature in the range from 100 to 500'000 mPa·s, especially from 1000 to 100'000 mPa·s, measured according to DIN 53015.

Polyorganosiloxanes of the formula (V) are easy to handle and crosslink with moisture and/or silane crosslinkers to give solid silicone polymers having elastic properties.

Suitable commercially available polyorganosiloxanes of the formula (V) are available, for example, from Wacker, Momentive Performance Material, GE Advanced Materials, Dow Corning, Bayer or Shin Etsu.

Preferably, the composition comprises, in addition to the polyorganosiloxane having terminal reactive silane groups, a silane crosslinker, especially a silane of the formula (VI), $$(R''')_q-Si-(G')_{4-q} \quad (VI)$$

where
R''' is a monovalent hydrocarbyl radical having 1 to 12 carbon atoms,
G' is a hydroxyl radical or is an alkoxy, acetoxy, ketoximato, amido or enoxy radical having 1 to 13 carbon atoms; and
q has a value of 0, 1 or 2, especially 0 or 1.

Particularly suitable silanes of the formula (VI) are methyltrimethoxysilane, ethyltrimethoxysilane, propyltrimethoxysilane, vinyltrimethoxysilane, methyltriethoxysilane, vinyltriethoxysilane, phenyltriethoxysilane, tetramethoxysilane, tetraethoxysilane, methyltris(methylethylketoximo)silane, vinyltris(methylethylketoximo)silane and methyltris(isobutylketoximo)silane.

In a further preferred embodiment, the polymer P containing reactive silane groups is an organic polymer containing reactive silane groups, especially a polyurethane, polyolefin, polyester, polycarbonate, polyamide, poly(meth)acrylate or polyether or a mixed form of these polymers, each of which bears one or preferably more than one silane group. The silane groups may be in pendant positions in the chain or in terminal positions and are bonded to the organic polymer via a carbon atom.

More preferably, the organic polymer P containing reactive silane groups is a polyolefin containing reactive silane groups or a polyurethane containing reactive silane groups or a polyether containing reactive silane groups or a mixed form of these polymers.

Most preferably, the organic polymer containing reactive silane groups is a polyether containing reactive silane groups.

The silane groups present in the organic polymer containing reactive silane groups are preferably alkoxysilane groups, especially alkoxysilane groups of the formula (VII)

$$\underset{(R^{15})_x}{\overset{|}{----Si}}-(OR^{14})_{3-x} \quad (VII)$$

where
$R^{14}$ is a linear or branched, monovalent hydrocarbyl radical having 1 to 5 carbon atoms, especially methyl or ethyl or isopropyl;
$R^{15}$ is a linear or branched, monovalent hydrocarbyl radical having 1 to 8 carbon atoms, especially methyl or ethyl; and
x is a value of 0 or 1 or 2, preferably 0 or 1, especially 0.

More preferably $R^{14}$ is methyl or ethyl.

For particular applications, the $R^{14}$ radical is preferably an ethyl group, since, in this case, ecologically and toxicologically harmless ethanol is released in the course of curing of the composition.

Particular preference is given to trimethoxysilane groups, dimethoxymethyl-silane groups or triethoxysilane groups.

In this context, methoxysilane groups have the advantage that they are particularly reactive, and ethoxysilane groups have the advantage that they are toxicologically advantageous and particularly storage-stable.

The organic polymer containing reactive silane groups has an average of preferably 1.3 to 4, especially 1.5 to 3, more preferably 1.7 to 2.8, silane groups per molecule. The silane groups are preferably terminal.

The organic polymer containing reactive silane groups preferably has a average molecular weight, determined by means of GPC against a polystyrene standard, in the range from 1'000 to 30'000 g/mol, especially from 2'000 to 20'000 g/mol. The organic polymer containing reactive silane groups preferably has a silane equivalent weight of 300 to 25'000 g/eq, especially of 500 to 15'000 g/eq.

The organic polymer containing reactive silane groups may be solid or liquid at room temperature. It is preferably liquid at room temperature.

Most preferably, the organic polymer containing reactive silane groups is a polymer containing reactive silane groups that is liquid at room temperature, where the silane groups are especially dialkoxysilane groups and/or trialkoxysilane groups, more preferably trimethoxysilane groups or triethoxysilane groups.

Processes for preparing organic polymers containing reactive silane groups are known to the person skilled in the art.

In a preferred process, organic polymers containing reactive silane groups are obtainable from the reaction of organic polymers containing allyl groups with hydrosilanes, optionally with chain extension using, for example, diisocyanates.

In a further preferred process, polyethers containing reactive silane groups are obtainable from the copolymerization of alkylene oxides and epoxysilanes, optionally with chain extension using, for example, diisocyanates.

In a further preferred process, organic polymers containing reactive silane groups are obtainable from the reaction of organic polyols with isocyanatosilanes, optionally with chain extension using diisocyanates.

In a further preferred process, polyethers containing reactive silane groups are obtainable from the reaction of organic polymers containing isocyanate groups, especially NCO-terminated urethane polymers from the reaction of polyols with a superstoichiometric amount of polyisocyanates, with aminosilanes, hydroxysilanes or mercaptosilanes. Polyethers containing reactive silane groups from this process are particularly preferred. This process enables the use of a multitude of inexpensive starting materials of good commercial availability, by means of which it is possible to obtain different polymer properties, for example high extensibility, high strength, low modulus of elasticity, low glass transition point or high weathering resistance.

More preferably, the organic polymer containing reactive silane groups is obtainable from the reaction of NCO-terminated urethane polyethers with aminosilanes or hydroxysilanes. Suitable NCO-terminated urethane polymers are obtainable from the reaction of polyols, especially polyether polyols, in particular polyoxyalkylenediols or polyoxyalkylenetriols, preferably polyoxypropylenediols or polyoxypropylenetriols, with a superstoichiometric amount of polyisocyanates, especially diisocyanates. Also other polyols, such as poly(meth)acrylate polyols, polyhydrocarbon polyols, in particular polybutadiene polyols, polyhdroxy functional fats or oils, polycarbonate polyols, polyester polyols and polyhydroxy functional acrylonitrilie/butadiene copolymers are suitable. Furthermore, small amounts of low molecular weight dihydric or polyhydric alcohols, such as diols, glycols, and sugar alcohols may be used as additives.

Preferably, the reaction between the polyisocyanate and the polyol is conducted with exclusion of moisture at a temperature of 50° C. to 160° C., optionally in the presence of suitable catalysts, with metered addition of the polyisocyanate in such a way that the isocyanate groups thereof are present in a stoichiometric excess in relation to the hydroxyl groups of the polyol. More particularly, the excess of polyisocyanate is chosen such that a content of free isocyanate groups of 0.1% to 5% by weight, preferably 0.2% to 4% by weight, more preferably 0.3% to 3% by weight, based on the overall polymer, remains in the resulting urethane polymer after the reaction of all hydroxyl groups.

Preferred diisocyanates are selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and 2,6-diisocyanate and any desired mixtures of these isomers (TDI) and diphenylmethane 4,4'-, 2,4'- and 2,2'-diisocyanate and any desired mixtures of these isomers (MDI). Particular preference is given to IPDI or TDI. Most preferred is IPDI. In this way, polyethers containing reactive silane groups with particularly good lightfastness are obtained.

Especially suitable as polyether polyols are polyoxyalkylenediols or polyoxyalkylenetriols having a degree of unsaturation lower than 0.02 meq/g, especially lower than 0.01 meq/g, and a mean molecular weight in the range from 400 to 25'000 g/mol, especially 1000 to 20'000 g/mol. As well as polyether polyols, it is also possible to use portions of other polyols, especially polyacrylate polyols, and low molecular weight diols or triols.

Suitable aminosilanes for the reaction with an NCO-terminated urethane polyether are primary and secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary amino-silanes such as 3-aminopropyltrimethoxysilane, 3-aminopropyldimethoxy-methylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the aminosilanes mentioned with ethoxy or isopropoxy groups in place of the methoxy groups on the silicon.

Suitable hydroxysilanes for the reaction with an NCO-terminated urethane polyether are especially obtainable from the addition of aminosilanes onto lactones or onto cyclic carbonates or onto lactides.

Aminosilanes suitable for the purpose are especially 3-aminopropyltrimeth-oxysilane, 3-aminopropyltriethoxysilane, 4-aminobutyltrimethoxysilane, 4-aminobutyltriethoxysilane, 4-amino-3-methylbutyltrimethoxysilane, 4-amino-3-methylbutyltriethoxysilane, 4-amino-3,3-dimethylbutyltrimethoxysilane, 4-amino-3,3-dimethylbutyltriethoxysilane, 2-aminoethyltrimethoxysilane or 2-aminoethyltriethoxysilane. Particular preference is given to 3-aminopropyltrimethoxysilane, 3-aminopropyltriethoxysilane, 4-amino-3,3-dimethylbutyl-trimethoxysilane or 4-amino-3,3-dimethylbutyltriethoxysilane.

Suitable lactones are especially γ-valerolactone, γ-octalactone, δ-decalactone, and ε-decalactone, especially γ-valerolactone.

Suitable cyclic carbonates are especially 4,5-dimethyl-1,3-dioxolan-2-one, 4,4-dimethyl-1,3-dioxolan-2-one, 4-ethyl-1,3-dioxolan-2-one, 4-methyl-1,3-dioxolan-2-one or 4-(phenoxymethyl)-1,3-dioxolan-2-one.

Suitable lactides are especially 1,4-dioxane-2,5-dione (lactide formed from 2-hydroxyacetic acid, also called "glycolide"), 3,6-dimethyl-1,4-dioxane-2,5-dione (lactide formed from lactic acid, also called "lactide") and 3,6- diphenyl-1,4-dioxane-2,5-dione (lactide formed from mandelic acid). Preferred hydroxysilanes which are obtained in this way are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide and N-(3-triethoxysilylpropyl)-2-hydroxypropyl carbamate.

In addition, suitable hydroxysilanes are also obtainable from the addition of aminosilanes onto epoxides or from the addition of amines onto epoxysilanes. Preferred hydroxysilanes which are obtained in this way are 2-morpholino-4 (5)-(2-trimethoxysilylethyl)cyclohexan-1-ol, 2-morpholino-4(5)-(2-triethoxysilyl-ethyl)cyclohexan-1-ol or 1-morpholino-3-(3-(triethoxysilyl)propoxy)propan-2-ol.

Further suitable polyethers containing reactive silane groups are commercially available products, especially the following: MS Polymer™ (from Kaneka Corp.; especially the S203H, S303H, S227, S810, MA903 and S943 products); MS Polymer™ or Silyl™ (from Kaneka Corp.; especially the SAT10, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Bayer MaterialScience AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35, WP1, and WP2 products). Particularly preferred organic polymers containing reactive silane groups have end groups of the formula (VIII)

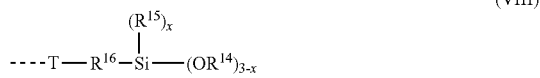

(VIII)

where
$R^{16}$ is a linear or branched divalent hydrocarbyl radical which has 1 to 12 carbon atoms and optionally has cyclic and/or aromatic moieties and optionally one or more heteroatoms, especially one or more nitrogen atoms;
T is a divalent radical selected from —O—, —S—, —N($R^{17}$)—, —O—CO—N($R^{17}$)—, —N($R^{17}$)—CO—O— and —N($R^{17}$)—CO—N($R^{17}$)—,
  where $R^{17}$ is a hydrogen radical or a linear or branched hydrocarbyl radical which has 1 to 20 carbon atoms and optionally has cyclic moieties, and which optionally has an alkoxysilane, ether or carboxylic ester group; and
$R^{14}$, $R^{15}$ and x have the definitions already given.

Preferably, $R^{16}$ is 1,3-propylene or 1,4-butylene, where butylene may be substituted by one or two methyl groups.
More preferably, $R^{16}$ is 1,3-propylene.

In some preferred embodiments of the moisture-curable composition according to the present invention, polymer P does not contain methoxysilyl groups. Instead, its reactive silane groups are ethoxysilane, propoxysilane, or higher alkoxysilane groups, preferably ethoxysilane groups. These embodiments lead to decreased methanol levels in the VOC during and after curing of the composition.

In the same or other preferred embodiments of the moisture-curable composition according to the present invention, the moisture-curable composition does not contain any compounds that split off methanol when hydrolyzed. Instead, it is preferred that only ethanol-splitting compounds (i.e. ethoxysilan-functional compounds) are comprised in the composition. This has the advantage that the composition is especially non-hazardous but still shows adequate curing behavior.

The composition furthermore may comprise between 0 and 40 wt.-%, preferably between 5 and 25 wt.-%, more preferably between 7 and 15 wt.-%, based on the total composition, of at least one plasticizer.

The plasticizer may be any of the plasticizers commonly used in compositions based on silane-functional polymers. These include, for example, carboxylic esters such as phthalates, especially dioctyl phthalate, bis(2-ethylhexyl) phthalate, bis(3-propylheptyl) phthalate, diisononyl phthalate or diisodecyl phthalate, diesters of ortho-cyclohexane-dicarboxylic acid, especially diisononyl 1,2-cyclohexanedicarboxylate, adipates, especially dioctyl adipate, bis(2-ethylhexyl) adipate, azelates, especially bis(2-ethylhexyl) azelate, sebacates, especially bis(2-ethylhexyl) sebacate or diisononyl sebacate, glycol ethers, glycol esters, organic phosphoric or sulfonic esters, sulfonamides, polybutenes, or fatty acid methyl or ethyl esters derived from natural fats or oils, also called "biodiesel".

Furthermore suitable are polymeric plasticizers. These have the advantage of lower migration tendency into surrounding areas and lower contribution to VOC levels.

The term "polymeric plasticizer" herein means a polymeric additive that is liquid at room temperature and contains no hydrolyzable silane groups. In contrast to traditional plasticizers, such as phthalates, the polymeric plasticizers generally have a higher molecular weight.

Preferably, the polymeric plasticizer has an average molecular weight $M_n$ of 500 to 12'000 g/mol, in particular 1'000 to 10'000 g/mol, more preferably 2'500 to 5'000 g/mol.

Suitable polymeric plasticizers include polyols, such as those suitable for the production of the organic polymers P mentioned there, as long as they are liquid at room temperature. Preferred polyols suitable as polymeric plasticizers include polyether polyols, polyester polyols, polyhydrocarbon polyols, polybutadiene polyols, and poly(meth)acrylate polyols. Particularly preferred are polyether polyols, especially those with an average molecular weight of $M_n$ of 500 to 12'000 g/mol, especially 1'000 to 10'000 g/mol, more preferably 2'500 to 5'000 g/mol.

Such polyols are especially suitable in combination with organic polymers P. Major advantages of using polyether polyols as polymeric plasticizers are an especially fast adhesion build-up and especially good adhesion properties.

Furthermore suitable are trialkylsilyl-terminated polydialkylsiloxanes, preferably trimethylsilyl-terminated polydimethylsiloxanes, especially having viscosities in the range from 10 to 1'000 mPa-s, or corresponding compounds in which some of the methyl groups have been replaced by other organic groups, especially phenyl, vinyl or trifluoropropyl groups. Those plasticizers are especially suitable in combination with polyorganosiloxanes as polymers P.

The composition may comprise small amounts of catalysts, especially for the crosslinking of silane groups. Suitable catalysts are especially basic nitrogen or phosphorus compounds.

Suitable basic nitrogen or phosphorus compounds are especially imidazoles, pyridines, phosphazene bases, secondary or tertiary amines, hexahydrotriazines, biguanides, guanidines, or amidines.

Nitrogen-containing compounds suitable as catalysts are in particular amines, especially N-ethyl-diisopropylamine, N,N,N',N'-tetramethylalkylenediamines, 1,4-diazabicyclo[2.2.2]octane; amidines such as especially 1,8-diazabicyclo[5.4.0]undec-7-ene (DBU), 1,5-diazabicyclo[4.3.0]non-5-ene (DBN), 6-dibutylamino1,8-diazabicyclo-[5.4.0]undec-7-ene; guanidines such as especially tetramethylguanidine, 2-guanidino-benzimidazole, acetylacetone-guanidine, 3-di-o-tolyl-guanidine, 2-tert-butyl-1,1,3,3-tetramethyl guanidine; and imidazoles, in particular N-(3-trimethoxysilylpropyl)-4,5-dihydroimidazole and N-(3-triethoxysilylpropyl)-4,5-dihydroimidazole.

In preferred embodiments, the composition comprises less than 0.1 wt.-%, based on the total composition, of such basic nitrogen or phosphorus catalysts, in particular less than 0.05 wt.-%, preferably less than 0.01 wt.-%, most preferably none such catalysts.

Embodiments containing low amounts and in particular no added such catalysts have the advantage that the exhibit higher storagy stability, better mechanical properties when cured and fewer unwanted effect such as blushing, bleeding, or staining on the cured composition's surface or the surrounding substrate.

The composition may comprise further constituents, especially the following auxiliaries and additives:

- adhesion promoters and/or crosslinkers, especially further aminosilanes, mercaptosilanes, epoxysilanes, (meth)acryloylsilanes, anhydridosilanes, carbamatosilanes, alkylsilanes or iminosilanes, oligomeric forms of these silanes, adducts formed from primary aminosilanes with epoxysilanes or (meth)acryloylsilanes or anhydridosilanes, amino-functional alkylsilsesquioxanes, 3-glycidoxypropyltrimethoxysilane, 3-glycidoxypropyltriethoxysilane or 3-ureidopropyltrimethoxysilane, or oligomeric forms of these silanes;
- desiccants or drying agents, especially tetraethoxysilane, vinyltrimethoxysilane, vinyltriethoxysilane or organoalkoxysilanes having a functional group in the a position to the silane group, especially N-(methyldimethoxysilylmethyl)-O-methylcarbamate, (methacryloyloxymethyl)silanes, methoxymethylsilanes, orthoformic esters, calcium oxide or molecular sieves, especially vinyltrimethoxysilane or vinyltriethoxysilane;
- additional plasticizers, especially reactive plasticizers, in the form of monofunctional polysiloxanes or monofunctional organic polymers, i.e. those that are silane-reactive only at one end;
- solvents;
- inorganic or organic fillers, especially natural, ground or precipitated calcium carbonates, optionally coated with fatty acids, especially stearic acid, baryte (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres;
- fibers, especially glass fibers, carbon fibers, metal fibers, ceramic fibers or polymer fibers such as polyamide fibers or polyethylene fibers;
- dyes;
- pigments, especially titanium dioxide or iron oxides;
- rheology modifiers, in particular thickeners or thixotropy additives, especially sheet silicates such as bentonites, derivatives of castor oil, hydrogenated castor oil, polyamides, polyurethanes, urea compounds, fumed silicas, cellulose ethers or hydrophobically modified polyoxyethylenes;
- stabilizers against oxidation, heat, light or UV radiation;
- natural resins, fats or oils such as rosin, shellac, linseed oil, castor oil or soya oil;
- non-reactive polymers that are preferably solid at room temperature such as, in particular, homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene-vinyl acetate copolymers (EVA) or atactic poly-α-olefins (APAO);
- flame-retardant substances, especially the already mentioned fillers aluminum hydroxide and magnesium hydroxide, or, in particular, organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis(diphenyl phosphate) or ammonium polyphosphates;
- surface-active substances, especially wetting agents, leveling agents, deaerating agents or defoamers;
- biocides, especially algicides, fungicides or substances that inhibit fungal growth;

and other substances customarily used in curable compositions. It may be advisable to chemically or physically dry certain constituents before mixing them into the composition.

In preferred embodiments of the moisture-curable composition according to the present invention, the composition furthermore comprises plasticizer, filler, thoxotropy additives, stabilizers, and/or pigments.

The composition preferably comprises between 0.5 and 2.5 wt.-%, preferably between 1 and 2 wt.-%, based on the total composition, of at least one desciccant or drying agent, most preferably vinyl trimethoxysilane. This range has the advantage that an optimal storage stability and skin formation time can be achieved without rendering the product too stiff and/or brittle after curing. In a preferred embodiment, the composition comprises at least one desiccant and at least one adhesion promoter and/or crosslinker.

In a preferred embodiment, the composition does not comprise any phthalates as plasticizers. Such compositions are toxicologically advantageous and have fewer problems with migration effects.

The composition is preferably produced and stored with exclusion of moisture. Typically, it is storage-stable with exclusion of moisture in a suitable package or arrangement, such as, more particularly, a bottle, a canister, a pouch, a bucket, a vat or a cartridge.

The composition may take the form of a one-component or of a multi-component, especially two-component, composition.

In the present document, "one-component" refers to a composition in which all constituents of the composition are stored in a mixture in the same container and which is curable with moisture.

In the present document, "two-component" refers to a composition in which the constituents of the composition are present in two different components which are stored in separate containers. Only shortly before or during the application of the composition are the two components mixed with one another, whereupon the mixed composition cures, optionally under the action of moisture.

If the composition comprises a polyorganosiloxane having terminal silane groups, preference is given either to a one-component composition, also referred to as RTV-1, or to a two-component composition, also referred to as RTV-2. In the case of an RTV-2 composition, the polyorganosiloxane having terminal silane groups is preferably a constituent of the first component, and a silane crosslinker, especially a silane crosslinker of the formula (VII), is preferably a constituent of the second component.

If the composition comprises an organic polymer containing reactive silane groups, the composition is preferably a one-component composition.

Any second or optionally further components is/are mixed with the first component prior to or on application, especially by means of a static mixer or by means of a dynamic mixer.

The composition is especially applied at ambient temperature, preferably within a temperature range between 0° C. and 45° C., especially 5° C. to 35° C., and cures under these conditions.

On application, the crosslinking reaction of the silane groups commences, if appropriate under the influence of moisture. Silane groups present can condense with silanol groups present to give siloxane groups (Si—O—Si groups). Silane groups present can also be hydrolyzed on contact with moisture to give silanol groups (Si—OH groups) and form siloxane groups (Si—O—Si groups) through subsequent condensation reactions. As a result of these reactions, the composition ultimately cures. The amidine of the formula (I) or a reaction product thereof accelerates this curing.

If water is required for the curing, this can either come from the air (air humidity), or else the composition can be contacted with a water-containing component, for example by painting, for example with a smoothing agent, or by spraying, or water or a water-containing component can be added to the composition on application, for example in the form of a water-containing or water-releasing liquid or paste. A paste is especially suitable if the composition itself is in the form of a paste.

In the case of curing by means of air humidity, the composition cures from the outside inward, at first forming a skin on the surface of the composition. What is called the "skin time" or "skin formation time" is a measure of the curing rate of the composition. The speed of curing is generally determined by various factors, for example the availability of water (e.g., relative air humidity), temperature, etc.

The composition is suitable for a multitude of uses, especially as a paint, varnish or primer, as a resin for production of fiber composites, as a rigid foam, flexible foam, molding, elastomer, fiber, film or membrane, as a potting compound, sealant, adhesive, covering, coating or paint for construction and industrial applications, for example as a seam seal, cavity seal, electrical insulation compound, spackling compound, joint sealant, weld or crimp seam sealant, assembly adhesive, bodywork adhesive, glazing adhesive, sandwich element adhesive, laminating adhesive, window and façade membrane adhesive, laminate adhesive, packaging adhesive, wood adhesive, parquet adhesive, anchoring adhesive, floor covering, floor coating, balcony coating, roof coating, concrete protection coating, parking garage coating, seal, pipe coating, anticorrosion coating, textile coating, damping element, sealing element or spackling compound.

The composition is particularly suitable as an adhesive and/or sealant, especially for joint sealing and for elastic adhesive bonds in construction and industrial applications, and as elastic coating with crack-bridging properties, especially for protection and/or sealing of, for example, roofs, floors, balconies, parking decks or concrete pipes.

The composition is thus preferably an adhesive or a sealant or a coating.

A composition of this kind typically comprises plasticizers, fillers, adhesion promoters and/or crosslinkers and desiccants, and optionally further auxiliaries and additives.

For an application as adhesive or sealant, the composition preferably has a pasty consistency with structurally viscous properties. Such a pasty sealant or adhesive is especially applied to a substrate from standard cartridges which are operated manually, by means of compressed air or with a battery, or from a vat or hobbock by means of a delivery pump or an extruder, optionally by means of an application robot.

For an application as coating, the composition preferably has a liquid consistency at room temperature with self-leveling properties. It may be slightly thixotropic, such that the coating is applicable to sloping to vertical surfaces without flowing away immediately. It is especially applied by means of a roller or brush or by pouring-out and distribution by means, for example, of a roller, a scraper or a notched trowel.

On application, the composition is preferably applied to at least one substrate. Suitable substrates are especially glass, glass ceramic, concrete, mortar, brick, tile, gypsum and natural rocks such as limestone, granite or marble;

metals and alloys such as aluminum, iron, steel and nonferrous metals, and also surface-finished metals and alloys such as galvanized or chromed metals or surface coated metals, such as Kynar®- or Duranar®-coated aluminum;

leather, textiles, paper, wood, woodbase materials bonded with resins, for example phenolic, melamine or epoxy resins, resin-textile composites and further polymer composites;

plastics such as polyvinyl chloride (rigid and flexible PVC), acrylonitrile-butadiene-styrene copolymers (ABS), polycarbonate (PC), polyamide (PA), polyesters, poly(methyl methacrylate) (PMMA), epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), and also fiber-reinforced plastics such as carbon fiber-reinforced plastics (CFP), glass fiber-reinforced plastics (GFP) and sheet molding compounds (SMC), where the plastics may have been surface-treated by means of plasma, corona or flames;

coated substrates such as powder-coated metals or alloys; paints or varnishes, especially automotive topcoats.

If required, the substrates can be pretreated prior to the application of the composition, especially by chemical and/ or physical cleaning methods or by the application of an adhesion promoter, an adhesion promoter solution or a primer.

In general, it is not required to pre-treat the surfaces prior to application of the composition. The composition shows an excellent adhesion profile on a large variety of unprimed, non-pretreated, and even uncleaned materials.

Another aspect of the present invention is thus the use of a at least one organosilane OS of the formula (I)

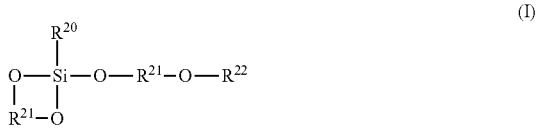

wherein
$R^{20}$ independently stands for a monovalent, optionally cyclic or branched, hydrocarbyl or heterocarbyl radical, optionally comprising aromatic moieties, which contains 1 to 12 carbon atoms and wherein the carbon atom next to the silicon atom either bonds via a C=C double bond to another carbon atom or bonds to a heteroatom selected from O, N, and S;
$R^{21}$ independently stands for a linear, cyclic, or branched divalent hydrocarbyl radical having 2 to 12 carbon atoms and optionally containing aromatic moieties; and
$R^{22}$ stands for a hydrogen atom or a group of the formula (Ia);

as a curing accelerator in moisture-curable compositions based on silane-functional polymers.

The compositions disclosed herein generally possess excellent mechanical properties, in particular regarding high tensile strength, high elongation at break, and high tear propagation resistance, and medium Shore A hardness, alongside with an excellent storage stability when shelved and advantageously low VOC levels during and after curing. This makes them especially suitable as general purpose elastic adhesives, sealants, and coatings, in particular for indoor use. It is possible to bond or seal two identical or two different substrates, especially the aforementioned substrates.

After the curing of the composition with water, especially in the form of air humidity, and/or with at least one suitable crosslinker, a cured composition is obtained.

The composition according to the present invention has, especially in embodiments with minimized meothoxysilane content, exceptionally low volatile organic carbon (VOC) levels during and after curing. Furthermore, it typically has a storage stability of at least 12 months in a unopened container.

Another aspect of the present invention is the use of an adhesive composition as described herein to adhesively bond, coat, or seal substrates.

The use of the composition gives rise to an article which especially has been bonded, sealed, or coated with the composition. The article is especially a built structure, especially a structure built by structural engineering or civil engineering, an industrially manufactured good or a consumable good, especially a window, a domestic appliance or a mode of transport such as, more particularly, an automobile, a bus, a truck, a rail vehicle, a ship, an aircraft or a helicopter; or the article may be an installable component thereof.

Another aspect of the present invention is thus a substrate, adhesively sealed, coated, or bonded by an adhesive composition described herein.

EXAMPLES

Adduced hereinafter are working examples which are intended to elucidate the invention described in detail. It will be appreciated that the invention is not restricted to these described working examples.

The term "standard climatic conditions" refers to a temperature of 23±1° C. and a relative air humidity of 50±5%.
Test Methods:

Skin Formation Time ("tack-free time") was determined under standard climatic conditions. To determine the skin formation time, a small portion of the composition (having a temperature of 23° C.) was applied in a layer thickness of about 2 mm onto a cardboard sheet and repeatedly touched in minute intervals on the surface by means of a LDPE pipette while time was recorded. The time after which no more residue could be found on the pipette after touching the sample's surface due to formation of a solid skin was determined to be the skin formation time. The shorter the skin formation time, the faster the sample is curing.

Tensile Strength and Elongation at Break were determined according to DIN EN 53504 (tensile speed: 200 mm/min), on cured films with a thickness of 2 mm after curing for days under standard climatic conditions.

Tear Propagation Resistance was determined according to DIN 53515, on films with a layer thickness of 2 mm after curing for 7 days under standard climatic conditions.

Shore Hardness was determined according to DIN 53505 using test specimens with a layer thickness of 6 mm after curing for 7 days under standard climatic conditions.
Compounds Used:

TABLE 1

Compounds used for the example compositions.

| Name | Description, trade name |
|---|---|
| Polymer STP-1 (Polymer P) | Polymer having silane groups; preparation detailed below |
| Polymer STP-2 (Polymer P) | Polymer having silane groups; preparation detailed below |
| Stabilizer | Benzophenone/hindered amine (HALS) light stabilizer package |
| DIDP (plasticizer) | Diisodecyl phthalate (Jayflex ® DIDP, ExxonMobil) |
| Thixotropy additive | Preparation see below |
| Pigment | Chemically inert pigment |
| VTMO | Vinyl trimethoxysilane (Dynasylan ®VTMO, Evonik) |
| AMMO | 3-Aminopropyltrimethoxysilane (Dynasylan ® AMMO, Evonik) |
| Silane OS | Silane according to formula (I) with $R^{20}$ = vinyl, $R^{21}$ = 2,2-dimethylpropanediyl, and $R^{22}$ = group of formula (Ia) (Silquest ® Y-15866, Momentive) |
| PCC (Filler) | Surface-treated, ultrafine precipitated calcium carbonate (Socal ® U1S2, Solvay) |
| GCC (Filler) | Natural ground limestone (Omyacarb ® 5 GU, Omya) |
| Sn catalyst | Dibutyltin dilaurate (9.5 wt.-% in plasticizer) |
| Ti catalyst | Titanium ethyl acetoacetate |

TABLE 1-continued

Compounds used for the example compositions.

| Name | Description, trade name |
|---|---|
| Amidine catalyst | 1,8-Diazabicyclo[5.4.0]undec-7-ene (DBU) (3 wt.-% in plasticizer) |

Preparation of a Polymer P Containing Reactive Silane Groups:

Polymer STP-1:

With exclusion of moisture, 1000 g of Acclaim® 12200 polyol (polyoxy-propylenediol having a low level of unsaturation, from Covestro; OH number 11.0 mg KOH/g), 43.6 g of isophorone diisocyanate (IPDI; Vestanat® IPDI, from Evonik), 126.4 g of diisodecyl phthalate (DIDP) and 0.12 g dibutyl tin dilaurate (DBTDL) were heated up to 90° C. while stirring constantly and left at this temperature until the content of free isocyanate groups determined by titrimetry had reached a stable value of 0.63% by weight. Subsequently, 63.0 g of diethyl N-(3-trimethoxysilylpropyl)-aminosuccinate (adduct formed from 3-aminopropyltrimethoxysilane and diethyl maleate; prepared according to the details in U.S. Pat. No. 5,364,955) were mixed in and the mixture was stirred at 90° C. until it was no longer possible to detect any free isocyanate by means of FT-IR spectroscopy. The polyether containing trimethoxysilane groups thus obtained, having a silane equivalent weight of about 6880 g/eq (calculated from the amounts used), was cooled down to room temperature and stored with exclusion of moisture.

Polymer STP-2:

With exclusion of moisture, 1000 g of Acclaim® 12200 polyol (polyoxy-propylenediol having a low level of unsaturation, from Covestro; OH number 11.0 mg KOH/g), 35.2 g of isophorone diisocyanate (IPDI; Vestanat® IPDI, from Evonik), 122.5 g of diisodecyl phthalate (DIDP) and 0.12 g dibutyl tin dilaurate (DBTDL) were heated up to 90° C. while stirring constantly and left at this temperature until the content of free isocyanate groups determined by titrimetry had reached a stable value of 0.39% by weight. Subsequently, 36.9 g of diethyl N-(3-trimethoxysilylpropyl)-aminosuccinate (adduct formed from 3-aminopropyltrimethoxysilane and diethyl maleate; prepared according to the details in U.S. Pat. No. 5,364,955) were mixed in and the mixture was stirred at 90° C. until it was no longer possible to detect any free isocyanate by means of FT-IR spectroscopy. The polyether containing trimethoxysilane groups thus obtained was cooled down to room temperature and stored with exclusion of moisture.

Preparation of the Thixotropy Additive:

A vacuum mixer was initially charged with 1000 g of diisodecyl phthalate (Palatinol® Z, BASF SE, Germany) and 160 g of diphenylmethane 4,4'-diisocyanate (Desmodur® 44 MC L, Bayer MaterialScience AG, Germany), and heated gently. Then 90 g of monobutylamine were gradually added dropwise while stirring vigorously. Stirring of the resulting white paste continued under reduced pressure while cooling for a further hour. The thus obtained thixotropy additive contains 20% by weight of thixotropic agent in 80% by weight of diisodecyl phthalate and was used with our further processing in the formulations.

Compositions Based on Polymers Containing Reactive Silane Groups:

Comparative examples (not according to the present invention) are identified in tables 2 to 5 by "(Ref.)".

Compositions C1 to C5:

A series of example compositions was prepared by mixing the ingredients shown in Table 2 under nitrogen atmosphere in a vacuum mixer. First, the polymers P, the plasticizer, the thixotropy additive, and VTMO (where applicable) were thoroughly mixed for minutes. Subsequently, the dried fillers were added with kneading during 15 minutes at 60° C. With the heater switched off, silanes OS (where applicable) and AMMO and catalysts (where applicable) were added and the compostions were subsequently processed to homogeneous paste during 10 minutes under vacuum. Said paste was subsequently filled into internally coated aluminum spreading piston cartridges that were closed airtight and stored under standard climate conditions for at least 24 h until the testing protocol was employed.

TABLE 2

Example compositions (all numbers in wt.-%, based on the total individual composition).

| Composition | C1 (Ref.) | C2 (Ref.) | C3 (Ref.) | C4 (Ref.) | C5 |
|---|---|---|---|---|---|
| Polymer STP-1 (Polymer P) | 7 | 7 | 7 | 7 | 7 |
| Polymer STP-2 (Polymer P) | 21 | 21 | 21 | 21 | 21 |
| Stabilizer | 0.5 | 0.5 | 0.5 | 0.5 | 0.5 |
| DIDP (plasticizer) | 8 | 8.3 | 7.9 | 9.5 | 9.5 |
| VTMO | 1.5 | 1.5 | 1.5 | — | — |
| Silane OS | — | — | — | 1 | 1.5 |
| Pigment | 3.5 | 3.5 | 3.5 | 3.5 | 3.5 |
| Thixotropy additive | 14 | 14 | 14 | 14 | 14 |
| GCC (Filler) | 17 | 17 | 17 | 17 | 17 |
| PCC (Filler) | 25 | 25 | 25 | 25 | 25 |
| AMMO | 1 | 1 | 1 | 1 | 1 |
| Sn catalyst | 1.5 | — | — | — | — |
| Ti catalyst | — | — | 0.4 | 0.5 | — |
| Amidine catalyst | — | 1.2 | 1.2 | — | — |

The test results are shown in Table 3:

TABLE 3

Testing results of the investigated samples

| Test results | C1 (Ref.) | C2 (Ref.) | C3 (Ref.) | C4 (Ref.) | C5 |
|---|---|---|---|---|---|
| Tensile strength [MPa] | 1.8 | 2.0 | 2.1 | 1.9 | 2.0 |
| Elongation at break [%] | 486 | 459 | 525 | 749 | 764 |
| Tear Propag. Resistance [N/mm] | 5.1 | 4.5 | 6.2 | 6.5 | 7.0 |
| Skin Formation Time [min] | 15 | 165 | 105 | 45 | 24 |
| Shore A Hardness | 35 | 33 | 33 | 25 | 29 |

The results clearly show that the inventive composition C5 not only has a high tensile strength comparable to all reference examples, but also an exceptionally high elongation at break. This makes it especially useful in joint sealant or elastic bonding applications. Furthermore, example C5 shows an exceptionally high tear propagation strength and a surprisingly low skin formation time, almost as low as the aggressively catalyzed reference example C1 that contains organotin catalysts. This proves that the composition according to the present invention may be formulated without common catalysts, thus has toxicological advantages, but surprisingly does not suffer from sluggish curing behavior. Surprisingly, it even exceeds the compositions catalyzed by common catalysts in terms of mechanical performance after curing.

The invention claimed is:
1. A moisture-curable composition, comprising
at least one polymer P containing reactive silane groups;

between 0.1 and 5 wt.-%, based on the total composition, of at least one organosilane OS of the formula (I)

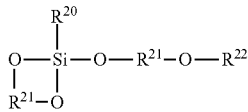
(I)

wherein

R$^{20}$ independently stands for a monovalent, optionally cyclic or branched, hydrocarbyl or heterocarbyl radical, optionally comprising aromatic moieties, which contains 1 to 12 carbon atoms and wherein the carbon atom next to the silicon atom either bonds via a C=C double bond to another carbon atom or bonds to a heteroatom selected from O, N, and S;

R$^{21}$ independently stands for a linear, cyclic, or branched divalent hydrocarbyl radical having 2 to 12 carbon atoms and optionally containing aromatic moieties; and R$^{22}$ stands for a hydrogen atom or a group of the formula (Ia);

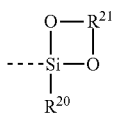
(Ia)

wherein
the curable composition does not contain catalytically active organometallic or acidic compounds.

2. The moisture-curable composition as claimed in claim 1, wherein the polymer P containing reactive silane groups is a polydiorganosiloxane having terminal reactive silane groups.

3. The moisture-curable composition as claimed in claim 1, wherein the polymer P containing reactive silane groups is an organic polymer containing reactive silane groups.

4. The moisture-curable composition as claimed in claim 2, wherein the organic polymer P containing reactive silane groups is a a polyurethane, polyolefin, polyester, polycarbonate, polyamide, poly(meth)acrylate or polyether or a mixed form of these polymers.

5. The moisture-curable composition as claimed in claim 1, wherein the composition does not contain catalytically active imidazoles, pyridines, phosphazene bases, secondary or tertiary amines, hexahydrotriazines, biguanides, guanidines, or amidines.

6. The moisture-curable composition as claimed in claim 1, wherein each R$^{20}$ is independently selected from the group consisting of vinyl, phenyl, —CH$_2$—NH-cyclohexyl, —CH$_2$-methacrylate, and —CH$_2$—NH—(C=O)—O—CH$_3$.

7. The moisture-curable composition as claimed in claim 1, wherein each R$^{21}$ is independently selected from the group consisting of ethanediyl, the isomers of propanediyl, the isomers of butanediyl, the isomers of pentanediyl, the isomers of hexanediyl, cyclohexanediyl, the isomers of heptanediyl, the isomers of octanediyl, and the isomers of nonanediyl.

8. The moisture-curable composition as claimed in claim 1, wherein the polymer P does not contain methoxysilyl groups.

9. The moisture-curable composition as claimed in claim 8, wherein the composition does not contain compounds that split off methanol when hydrolyzed.

10. The moisture-curable composition as claimed in claim 1, wherein R$^{20}$ is vinyl and/or R$^{21}$ is a substituted or non-subsituted propandediyl group.

11. The moisture-curable composition as claimed in claim 1, wherein the composition comprises the polymer P with an amount of between 10 and 40 wt.-%, based on the total composition.

12. The moisture-curable composition as claimed in claim 1, wherein the composition furthermore comprises between 0.5 and 2.5 wt.-%, based on the total composition, of a monomeric or oligomeric aminofunctional alkoxysilane.

13. The moisture-curable composition as claimed in claim 1, wherein the composition furthermore comprises plasticizer, filler, thixotropy additives, stabilizers, and/or pigments.

14. A method comprising adhesively bonding, coating, or sealing substrates with a moisture-curable composition according to claim 1.

15. A method comprising:
accelerating curing of a moisture-curable composition based on silane-functional polymers with a curing accelerator that includes
at least one organosilane OS of the formula (I)

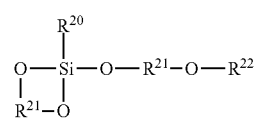
(I)

wherein

R$^{20}$ independently stands for a monovalent, optionally cyclic or branched, hydrocarbyl or heterocarbyl radical, optionally comprising aromatic moieties, which contains 1 to 12 carbon atoms and wherein the carbon atom next to the silicon atom either bonds via a C=C double bond to another carbon atom or bonds to a heteroatom selected from O, N, and S;

R$^{21}$ independently stands for a linear, cyclic, or branched divalent hydrocarbyl radical having 2 to 12 carbon atoms and optionally containing aromatic moieties; and R$^{22}$ stands for a hydrogen atom or a group of the formula (Ia);

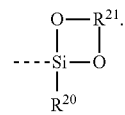
(Ia)

* * * * *